US011554385B2

(12) United States Patent
Lamers et al.

(10) Patent No.: US 11,554,385 B2
(45) Date of Patent: Jan. 17, 2023

(54) COATED SUBSTRATES PREPARED WITH WATERBORNE SEALER AND PRIMER COMPOSITIONS

(71) Applicant: PPG INDUSTRIES OHIO, INC., Cleveland, OH (US)

(72) Inventors: Paul H. Lamers, Allison Park, PA (US); Casey Marie Sample, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1052 days.

(21) Appl. No.: 14/943,133

(22) Filed: Nov. 17, 2015

(65) Prior Publication Data

US 2017/0136493 A1  May 18, 2017

(51) Int. Cl.
| | |
|---|---|
| *B05D 7/00* | (2006.01) |
| *C08G 18/70* | (2006.01) |
| *C08G 18/08* | (2006.01) |
| *C08G 18/75* | (2006.01) |
| *C08G 18/66* | (2006.01) |
| *C08G 18/24* | (2006.01) |
| *C08G 18/32* | (2006.01) |
| *C08F 265/06* | (2006.01) |
| *C08G 18/68* | (2006.01) |
| *C09D 175/04* | (2006.01) |
| *C08G 18/34* | (2006.01) |
| *B05D 1/02* | (2006.01) |
| *B05D 1/18* | (2006.01) |
| *B05D 1/28* | (2006.01) |
| *C25D 7/00* | (2006.01) |

(52) U.S. Cl.
CPC ............ *B05D 7/50* (2013.01); *B05D 1/02* (2013.01); *B05D 1/18* (2013.01); *B05D 1/28* (2013.01); *B05D 7/574* (2013.01); *C08F 265/06* (2013.01); *C08G 18/0823* (2013.01); *C08G 18/246* (2013.01); *C08G 18/3206* (2013.01); *C08G 18/348* (2013.01); *C08G 18/6659* (2013.01); *C08G 18/683* (2013.01); *C08G 18/706* (2013.01); *C08G 18/755* (2013.01); *C09D 175/04* (2013.01); *C25D 7/00* (2013.01); *B05D 2202/10* (2013.01); *B05D 2202/25* (2013.01)

(58) Field of Classification Search
CPC ... B05D 7/50; B05D 1/02; B05D 1/18; B05D 1/28; B05D 7/574; B05D 2202/10; B05D 2202/02; C08F 265/06; C08G 18/0823; C08G 18/246; C08G 18/3206; C08G 18/34; C08G 18/6659; C08G 18/683; C08G 18/706; C08G 18/755; C09D 175/04

See application file for complete search history.

(56) References Cited

U.S. PATENT DOCUMENTS

| | | | |
|---|---|---|---|
| 5,082,757 A * | 1/1992 | Keoshkerian | ...... G03G 9/09328 428/402.24 |
| 5,917,083 A | 6/1999 | Konig et al. | |
| 6,342,144 B1 * | 1/2002 | December | ................ B05D 1/36 204/484 |
| 7,294,656 B2 | 11/2007 | Bach et al. | |
| 8,829,080 B2 | 9/2014 | Shirakami et al. | |
| 2006/0052526 A1 | 3/2006 | Weikard et al. | |
| 2009/0075063 A1 * | 3/2009 | Iida | .................... C08G 65/3322 428/327 |
| 2014/0275362 A1 | 9/2014 | Fenn et al. | |
| 2016/0288164 A1 | 10/2016 | Sato et al. | |
| 2018/0021810 A1 | 1/2018 | Takayama et al. | |
| 2018/0022955 A1 | 1/2018 | Koyama et al. | |

FOREIGN PATENT DOCUMENTS

| | | |
|---|---|---|
| CA | 2181934 A1 | 1/1997 |
| CN | 101896521 A | 11/2010 |
| EP | 1242548 | 9/2002 |
| EP | 1736246 | 12/2006 |

(Continued)

OTHER PUBLICATIONS

Hirose et al., "The structrue and properties of core-shell type acrylic-polyurethane hybrid aqueous emulsions", 1997, Elsevier, Progress in Organic Coatings 31 pp. 157-169 (Year: 1997).*

(Continued)

*Primary Examiner* — Alicia J Sawdon
*Assistant Examiner* — Laura B Figg
(74) *Attorney, Agent, or Firm* — Krisanne Shideler

(57) ABSTRACT

The present invention provides multilayer coated substrates, prepared using primer and/or sealer compositions comprising waterborne curable film-forming compositions, in turn comprising:
  a) an aqueous dispersion of a pigment and
    i) polymeric urethane-shell particles having a care-shell morphology and having hydroxyl functional groups, wherein the core is prepared from a monomer mixture comprising hydrophobic, ethylenically unsaturated monomers and the shell comprises a polyurethane or polyurethane-urea polymer; or
    ii) polymeric acrylic-shell particles having a core-shell morphology and having hydroxyl functional groups, wherein the core is prepared from a monomer mixture comprising hydrophobic, ethylenically unsaturated monomers and the shell is prepared from a monomer mixture comprising hydrophilic, ethylenically unsaturated monomers;
  b) a polyisocyanate crosslinking agent; and optionally
  c) a hydroxyl functional, water dispersible acrylic polymer.

14 Claims, No Drawings

(56) References Cited

FOREIGN PATENT DOCUMENTS

| EP | 1868736 | 12/2007 |
|---|---|---|
| JP | 2001262053 A | 9/2001 |
| WO | WO-2013027093 A1 | 2/2013 |

OTHER PUBLICATIONS

Schmitt et al., "Waterborne Polyurethane Coatings used in Direct-to-Metal Applications", The Waterborne Symposium: Proceedings of the Thirty-eighth Annual International Waterborne, High-Solids, and Powder Coatings Symposium, Feb. 28-Mar. 4, 2011, pp. 20-27, New Orleans, Louisiana.
Machine English translation of CN 101896521A.

\* cited by examiner

COATED SUBSTRATES PREPARED WITH WATERBORNE SEALER AND PRIMER COMPOSITIONS

FIELD OF THE INVENTION

The present invention relates to multilayer coated substrates prepared with waterborne sealer and/or primer compositions.

BACKGROUND OF THE INVENTION

In the automotive refinish industry, a typical multilayer coating stack applied to a substrate includes a solventborne primer, a solventborne sealer, and one or more aesthetic topcoats. The substrate and each applied coating layer are usually sanded between applications for adhesion and appearance purposes. For the sake of convenience it is desired that each coating dry and/or cure to an extent that it may be sandable within fifteen minutes of application. Each coating is also designed to provide high film build with a minimum of coating layers, yielding smoothness and leveling with no pops or pinholes. As new regulations continue to compel coatings manufacturers to reduce emissions, challenges arise in designing environmentally friendly refinish coatings with comparable properties to their solventborne predecessors.

It would be desirable to provide waterborne sealer and primer compositions that may be used to prepare multilayer coated substrates, with properties similar to their solventborne counterparts.

SUMMARY OF THE INVENTION

The present invention is directed to a multilayer coated substrate comprising:
  A) a substrate;
  B) a primer composition applied directly to a surface of the substrate, forming a first coating;
  C) a sealer composition applied on top of the first coating; and
  D) at least one topcoat applied on top of the sealer composition.

The present invention is further directed to a multilayer coated substrate comprising:
  A) a substrate;
  B) a first composition comprising a primer or sealer composition applied directly to a surface of the substrate, forming a first coating; and
  C) at least one topcoat applied on top of the first coating.

The primer and/or sealer compositions comprise a waterborne curable film-forming composition, which, in turn, comprises:
  a) a first component comprising an aqueous dispersion of a pigment and either:
    i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
    ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;
  b) a second component comprising a polyisocyanate crosslinking agent; and optionally
  c) a hydroxyl functional, water dispersible acrylic polymer.

DETAILED DESCRIPTION OF THE INVENTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Also for molecular weights, whether number average ($M_n$) or weight average ($M_w$), these quantities are determined by gel permeation chromatography using polystyrene as standards as is well known to those skilled in the art and such as is discussed in U.S. Pat. No. 4,739,019, at column 4, lines 2-45.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "a" cationic acrylic resin derived from an epoxy functional acrylic resin, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretic& number of equivalents of functional groups to give the equivalent weight. For example, urethane equivalent weight is based on the equivalents of urethane groups in the polyurethane material.

As used in the following description and claims, the following terms have the meanings indicated below:

As used herein, the term "polymer" is meant to refer to prepolymers, oligomers and both homocopolymers and copolymers; the prefix "poly" refers to two or more. By "composite material" is meant a combination of two or more differing materials.

As used herein "based on the total weight of resin solids" or "based on the total weight of organic binder solids" (used interchangeably) of the composition means that the amount of the component added during the formation of the composition is based upon the total weight of the resin solids (non-volatiles) of the film forming materials, including cross-linkers and polymers present during the formation of the composition, but not including any water, solvent, or any additive solids such as hindered amine stabilizers, photoinitiators, pigments including extender pigments and fillers, flow modifiers, catalysts, and UV light absorbers.

As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. By ambient conditions is meant that the coating undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). Once cured or crosslinked, a thermosetting resin will not melt upon the application of heat and is insoluble in solvents. As used in this specification and the appended claims, the articles "a," "an," and "the" include plural referents, and are used interchangeably with the terms "at least one" and "one or more", unless expressly and unequivocally limited to one referent.

The various examples of the present invention as presented herein are each understood to be non-limiting with respect to the scope of the invention.

The term "reactive" refers to a functional group capable of undergoing a chemical reaction with itself and/or other functional groups spontaneously or upon the application of heat or in the presence of a catalyst or by any other means known to those skilled in the art.

By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition.

The multilayer coated substrates of the present invention may comprise:

A) a substrate;

B) a primer composition applied directly to a surface of the substrate, forming a first coating;

C) a sealer composition applied on top of the first coating; and

D) at least one topcoat applied on top of the sealer composition.

Alternatively, the multilayer coated substrates of the present invention may comprise:

A) a substrate;

B) a first composition comprising a primer or sealer composition applied directly to a surface of the substrate, forming a first coating; and C) at least one topcoat applied on top of the first coating. In this scenario, there is only a primer or a sealer present in the coating stack, but not both.

Non-metallic substrates A) include polymeric, plastic, polyester, polyolefin, polyamide, cellulosic, polystyrene, polyacrylic, poly(ethylene naphthalate), polypropylene, polyethylene, nylon, EVOH, poly(lactic acid), other "green" polymeric substrates, poly(ethylene terephthalate) ("PET"), polycarbonate, polycarbonate acrylonitrile butadiene styrene ("PC/ABS"), polyamide, polymer composites and the like. Car parts typically formed from thermoplastic and thermoset materials include bumpers and trim.

The metal substrates used in the present invention include ferrous metals, non-ferrous metals and combinations thereof. Suitable ferrous metals include iron, steel, and alloys thereof. Non-limiting examples of useful steel materials include cold rolled steel, pickled steel, steel surface-treated with any of zinc metal, zinc compounds and zinc alloys (including electrogalvanized steel, hot-dipped galvanized steel, GALVANNEAL steel, and steel plated with zinc alloy) and/or zinc-iron alloys. Also, aluminum, aluminum alloys, zinc-aluminum alloys such as GALFAN, GALVALUME, aluminum plated steel and aluminum alloy plated steel substrates may be used, as well as magnesium metal, titanium metal, and alloys thereof. Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below.

The substrate may alternatively comprise more than one metal or metal alloy in that the substrate may be a combination of two or more metal substrates assembled together such as hot-dipped galvanized steel assembled with aluminum substrates. The substrate may alternatively comprise a composite material such as a fiberglass composite. It is desirable to have a coating system which can be applied to both metal and non-metal parts. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the substrate can be in the form of a sheet, plate, bar, rod or any shape desired, but it is usually in the form of an automobile part, such as a body, door, fender, hood or bumper. The thickness of the substrate can vary as desired.

The substrates to be used may be bare substrates. By "bare" is meant a virgin substrate that has not been treated with (or has been stripped of) any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

Before depositing any coating compositions upon the surface of the substrate, it is common practice, though not necessary, to remove foreign matter or previously applied paints such as OEM coatings from the surface by thoroughly stripping, cleaning and degreasing the surface. When the substrate is not an existing vehicle part, such cleaning typically takes place after forming the substrate (stamping, welding, etc.) into an end-use shape. The surface of the substrate can be cleaned by physical or chemical means, or both, such as mechanically abrading the surface (e.g., sanding) or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

In an OEM setting, a metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the Handbook of Chemistry and Physics, 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®. A repair primer coating is conventionally applied to a substrate in several application layers with a total dry film thickness around 100 to 150 microns. The purpose of the primer layer is to even out slight underlayer thickness variations that are created when the original Class A surface is partially sanded, causing a gradient of film thicknesses on top of which the repair layering system is applied. To provide this even surface, a significant portion of the thickness of the primer may be removed during the sanding step (circa. 50%). Significantly more importance is therefore placed on the ability to attain 50 micron dry film thickness per application step and the sanding properties of the primer, rather than on the smoothness of the primer itself.

In contrast, the purpose of applying a sealer over a repair area is to provide a smooth and consistent surface on top of which may be applied the repair topcoat layers. The sealer is expected to provide this smoothness with essentially no sanding, and the sealer is conventionally applied in one coat at a dry film thickness around 25 microns. The sealer may be applied over a previously applied primer to hide the sand scratch marks produced when sanding the primer. Oftentimes, in the absence of a sealer, these sanding marks may be transmitted through to the basecoat and are visible as an optical defect in the repair part. A sealer may also be applied to a partial sand-through repair spot to negate the often variable surface energies created by the multiple exposed surfaces. These variable surface energies sometimes lead to optical defects visible in the basecoat layer (known as "ringing"). In this case, the sealer provides a consistent surface energy layer across the surface, on top of which the topcoat is applied. Because the sealer is applied prior to the repair topcoat and is generally not sanded, the "feather-out" area towards the edge of the repair where the contiguous sealer film blends into the original, unsanded area should be smooth enough to be topcoated without additional processing. It is further desirable for the sealer to dry and be processable within 10 to 15 minutes after application.

The multi-layer coated substrates of the present invention may further comprise B) a primer composition applied directly to a surface of the substrate, forming a first coating; and C) a sealer composition applied on top of the first coating. A topcoat may then be applied to the sealer composition. Alternatively, the multi-layer coated substrates of the present invention may further comprise B) a first composition comprising either a primer or sealer composition applied directly to a surface of the substrate, forming a first coating. A topcoat may then be applied to the first coating. At least one of the primer and sealer compositions comprises a waterborne curable film-forming composition which, in turn, comprises:

a) a first component comprising an aqueous dispersion of a pigment and
- i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
- ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;

b) a second component comprising a polyisocyanate crosslinking agent; and optionally c) a hydroxyl functional, water dispersible acrylic polymer.

Suitable pigments for use in the aqueous dispersion of the first component a) include any organic and/or inorganic pigments typically used in primer or sealer compositions. Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

The polymeric particles used in the first component a) of the waterborne curable film-forming composition may comprise i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer.

The core (interior domain) and shell (surface domain) polymers may be covalently attached to each other, and the polymeric particles are typically formed by emulsion polymerization in an aqueous medium. Exemplary polymerization methods are demonstrated in the examples below. The core typically constitutes 30 to 70 percent by weight of the polymeric particle, while the shell usually makes up 70-30 percent by weight of the polymeric particle. Often the weight ratio of the core to the shell is greater than 1:1. Also, the core may be internally crosslinked through the use of monomers having multiple ethylenically unsaturated groups, such as ethylene glycol dimethacrylate. These internally crosslinking monomers are typically used in amounts up to 10 percent by weight, such as 3-10 percent by weight, based on the total weight of resin solids in the particles. The shell polymer is designed to be more polar than the core by including functional groups such as hydroxyl and acid groups. The shell polymer is typically formed from polyisocyanates and polyols, including acid functional polyols, in an amount sufficient to allow for dispersion of the polymeric particles in an aqueous medium.

Ethylenically unsaturated monomers used to prepare the core of the polymeric urethane-shell particles may include hydrophobic monomers such as n-butyl (meth)acrylate, isobutyl (meth)acrylate, lauryl (meth)acrylate, 2-ethylhexyl (meth)acrylate, stearyl (meth)acrylate, and t-butyl (meth) acrylate, usually together with one or more other polymerizable ethylenically unsaturated monomers, including monomers having multiple ethylenically unsaturated groups such as ethylene glycol dimethacrylate and hexanediol diacrylate. By "hydrophobic" is meant that the monomers have non-polar properties and have a tendency to interact with, be miscible with, or be dissolved by non-polar solvents such as alkanes and oils. By definition, a molecule may be non-polar either when there is an equal sharing of electrons between the two atoms of a diatomic molecule or because of the symmetrical arrangement of polar bonds in a more complex molecule, such that there is no overall dipole in the molecule.

Other useful alkyl esters of acrylic acid or methacrylic add include aliphatic alkyl esters containing from 1 to 30, and usually 4 to 18 carbon atoms in the alkyl group. Non-limiting examples include methyl (meth)acrylate, ethyl (meth)acrylate, and n-butyl (meth)acrylate. Suitable other copolymerizable ethylenically unsaturated monomers include vinyl aromatic compounds such as styrene and vinyl toluene. Hydroxyl functional ethylenically unsaturated monomers such as hydroxyethyl (meth)acrylate and hydroxypropyl (meth)acrylate may also be used in amounts that do not significantly adversely affect the hydrophobicity of the core.

The polymeric urethane-shell parades often contain primary hydroxyl functional groups. Usually, more than 50 percent of the hydroxyl functional groups in the particles are primary; often more than 75 percent, and more often more than 90 percent. It is also possible that 100 percent of the hydroxyl functional groups in the particles may be primary. An exemplary monomer mixture used to prepare the core of the polymeric particles comprises at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth)acrylate, and styrene, and optionally at least one of hydroxyethyl (meth) acrylate and hydroxypropyl (meth)acrylate.

The shell of the polymeric urethane-shell particles comprises a polyurethane or polyurethane-urea polymer containing add functional groups. Polyurethane polymers are prepared by reacting polyols with a polyisocyanate; often the OH/NCO equivalent ratio is less than 1:1 so that free isocyanate groups are present in the intermediate isocyanate prepolymer. Suitable polyols include ethylene glycol, propylene glycol, butylene glycol, 1,6-hexylene glycol, neopentyl glycol, diethylene glycol, glycerol, trimethylol propane, and pentaerythritol. Polyols having dual functionality such as dimethylol propionic add are also suitable, to incorporate acid functional groups into the resulting polyurethane. Polymeric polyols such as acrylics and polyester polyols may also be used. Such polymeric polyols may additionally have acid functional groups. The organic polyisocyanate which is used to prepare the polyurethane can be an aliphatic or an aromatic polyisocyanate or a mixture of the two. Diisocyanates are most often used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. The free isocyanate end groups are then reacted with polyols, such as trimethylol propane and pentaerythritol to produce a urethane shell with a plurality of curable chain-end hydroxyl groups. This molecular architecture is particularly advantageous for ambient cure applications.

As noted above, the polyurethanes can be prepared with unreacted carboxylic acid groups, which upon neutralization with bases such as amines allows for dispersion into aqueous medium. Neutralization of acid groups on the polymer may be done using, for example, inorganic bases such as ammonium hydroxide or amines such as dimethylethanolamine, diisopropanolamine, triethylamine, and the like. Effective dispersion techniques may include high shear mixing such as by homogenization, emulsification by use of an emulsifier, use of rotor/stator mixers, Cowles dispersers, or mixing a small volume of material with a conventional stirrer at a high agitation rate.

Where the shell of the polymeric particles comprises a polyurethane-urea polymer, a polyurethane polymer may be prepared using reactants described above, but with an OH/NCO equivalent ratio less than 1:1 so that free isocyanate groups are present in the product. During production of the particles in the aqueous medium, the free isocyanate groups on the polyurethane polymer shell may be reacted with (poly)amines present in the aqueous medium to form urea linkages on the particles.

A "polyamine" is an amine with at least two amino groups. For example, the polyamine may be a diamine, and the amine nitrogens on the diamine are equally reactive; that is, all of the amine nitrogens are equally likely to react with another functional group. Alternatively, the amine nitrogens of the diamine may be unequal in reactivity due to steric hindrance. Examples of suitable diamines include ethylene diamine, 1,2-diaminopropane, 1,5-diamino-2-methylpentane, diaminopentane, 1,2-diaminocyclohexane, 1,6-diaminohexane, 1,11-diaminoundecane, 1,12-diaminododecane, 3-(cyclohexylamino)propylamine, 1-amino-3,3,5-trimethyl-5-aminomethylcyclohexane, (isophorone diamine ("IPDA")), 4,4'-diaminodicyclohexylmethane, 3,3'-dimethyl-4,4'-diaminodicyclohexyl methane, 3,3'-[1,4-butanediylbis-(oxy)bis]-1-propanamine, methanediamine, and diamino functional polyether polyamines having aliphatically bound primary amino groups, examples of which include JEFFAMINE D-230, JEFFAMINE D-400, JEFFAMINE D-2000, and JEFFAMINE D-4000, available from Huntsman Corporation.

Suitable higher polyamines include primary and secondary triamines and/or tetraamines. Examples of suitable triamines include but are not limited to diethylene triamine, dipropylene triamine, bis(hexamethylene) triamine and triamino functional polyetherpolyamines having aliphatically bound primary amino groups (examples include JEFFAMINE T-403, T-3000, T-5000, available from Huntsman Corporation). For example, the amine can be an amine terminated (that is, an amine on each end, thus rendering the amine difunctional) polyethylene or polypropylene glycol, such as a polypropylene having an average molecular weight of 4000 or a polyethylene having an average molecular weight of 600. One skilled in the art will understand that these types of products are sold with a mixture of polymers having a relatively wide range of molecular weight, such as 4000+/−500 or 600+/−200 but that the average molecular weight is 4000 or 600. Monoamines may also be used to react with the isocyanate to generate urea linkages. Suitable monoamines include ethanolamine and diethanolamine.

The polymeric particles used in the first component a) of the waterborne curable film-forming composition may alternatively comprise ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers.

The core of the polymeric acrylic-shell particles may be prepared similarly to that of the polymeric urethane-shell particles, using similar monomers and techniques. The shell of the polymeric acrylic-shell particles is prepared from a monomer mixture comprising hydrophilic, ethylenically unsaturated monomers, or monomers that may be rendered hydrophilic. By "hydrophilic" is meant, as is understood in the art, that the monomers or repeat units in the resulting polymer have a tendency to interact with, be miscible with, or be dissolved by water and/or other polar substances. The monomers themselves may be polar. By definition, a polar molecule has a net dipole as a result of the opposing charges (i.e. having partial positive and partial negative charges) from polar bonds arranged asymmetrically within its structure. When add functional monomers are used, the hydrophilic monomers may be selected so as to provide the resulting polymer with an acid value of at least 45 mg KOH/g resin, such as at least 60 mg KOH/g resin, or at least 125 mg KOH/g resin, based on the total weight of resin solids of the polymer. Suitable hydrophilic monomers include one or more of methoxypolyethylene glycol (meth)acrylate, (meth)acrylic acid, crotonic acid, itaconic acid, maleic acid and fumaric acid. Hydroxyl functional ethylenically unsaturated monomers may be used, such as hydroxyalkyl acrylates and methacrylates; i.e., hydroxyalkyl (meth)acrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone, as well as other beta-hydroxy ester functional monomers. Methyl (meth)acrylate, (meth)acrylonitrile, dimethylaminoethyl (meth)acrylate, and hydrophilic (meth)acrylamides such as isopropyl (meth)acrylamide are also suitable hydrophilic monomers.

Other suitable hydrophilic monomers include amine functional ethylenically unsaturated monomers such as dimethylaminoethyl (meth)acrylate, diethylaminoethyl (meth)acrylate, and the like. Protonated (cationic) derivatives of these monomers may also be used. As noted above, monomers containing groups that may be rendered hydrophilic after polymerization may also be used to form the shell of the particle. For example, epoxy functional ethylenically unsaturated monomers such as glycidyl methacrylate and the like may be used to form the polymer, and then epoxy functional groups on the resulting polymer may be post-reacted with a compound such as an amino alcohol using known methods to render the polymer more hydrophilic.

In an exemplary particle, the polymeric acrylic-shell particles have primary hydroxyl functional groups; the core of the polymeric acrylic-shell particles is prepared from a monomer mixture comprising at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth)acrylate, and styrene and optionally at least one of hydroxyethyl (meth)acrylate and hydroxypropyl (meth)acrylate; and the shell of the polymeric acrylic-shell particles is prepared from a monomer mixture comprising at least one of methoxypolyethylene glycol (meth)acrylate, (meth)acrylic acid, crotonic acid, itaconic acid, maleic acid, fumaric acid, hydroxyethyl (meth)acrylate, hydroxypropyl (meth)acrylate, 4-hydroxybutyl (meth)acrylate, hydroxy functional adducts of caprolactone methyl (meth)acrylate, (meth)acrylonitrile, dimethylaminoethyl(meth)acrylate, isopropyl (meth)acrylamide, dimethylaminoethyl (meth)acrylate, diethylaminoethyl (meth)acrylate, and ethylene glycol dimethacrylate. These particles are particularly useful in sealer compositions.

The polymeric particles i) and ii) have a core/shell structure as noted above. Though not intending to be bound by any theory, it is believed that the core-shell structures of the particles contribute to higher film builds attainable with the waterborne curable film-forming compositions used as primers and/or sealers in the multilayer coated substrates of the present invention, compared to those of conventional primer and sealer compositions.

The particles used in the compositions of the present invention typically have an average particle size of 10 to 300 nm, such that they would be considered nanoparticles. Particle size may be determined from among the numerous techniques known in the art, such as the method described below. The particle size is measured with a Malvern Zetasizer, which is a high performance two angle particle size analyzer for the enhanced detection of aggregates and measurement of small or dilute samples, and samples at very low or high concentration using dynamic light scattering. Typical applications of dynamic light scattering are the characterization of particles, emulsions or molecules, which have been dispersed or dissolved in a liquid. The Brownian motion of particles or molecules in suspension causes laser light to be scattered at different intensities. Analysis of these intensity fluctuations yields the velocity of the Brownian motion and hence the particle size using the Stokes-Einstein relationship. The reported particle sizes for all examples are the Z average mean value.

The first component a) is present in the waterborne curable film-forming composition in amounts of at least 25 percent by weight, such as at least 40 percent by weight or at least 50 percent by weight, and in amounts of at most 95 percent by weight, such as at most 90 percent by weight or at most 85 percent by weight, based on the total weight of resin solids in the curable film-forming composition.

The second component b) in the waterborne curable film-forming composition comprises a polyisocyanate crosslinking agent. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Mixtures of polyisocyanate crosslinking agents can be used.

Polyisocyanates that may be utilized as crosslinking agents can be prepared from a variety of isocyanate-containing materials. Examples of suitable polyisocyanates include the following diisocyanates and trimers prepared therefrom: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. Isocyanate prepolymers, for example reaction products of polyisocyanates with polyols also can be used. The polyisocyanate crosslinking agent is usually water emulsifiable or dispersible for use in the waterborne curable film-forming compositions of the present invention.

If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lecterns such as epsilon-caprolactam, pyrazoles such as dimethyl pyrazole, and amines such as dibutyl amine.

The amount of the crosslinking agent in the curable film-forming composition generally ranges from 5 to 75 percent by weight based on the total weight of resin solids in the curable film-forming composition. For example, the minimum amount of crosslinking agent may be at least 5 percent by weight, often at least 10 percent by weight and more often, at least 15 percent by weight. The maximum amount of crosslinking agent may be 75 percent by weight, more often 60 percent by weight, or 50 percent by weight. Ranges of crosslinking agent may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, and 15 to 75 percent by weight.

The waterborne curable film-forming composition may further comprise c) a hydroxyl functional, water dispersible acrylic polymer. Suitable acrylic compounds include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The water dispersible acrylic polymer c) can include hydroxyl functional groups, which are often incorporated into the polymer by including one or more hydroxyl functional monomers in the reactants used to produce the copolymer. The ratio of primary to secondary hydroxyl functional groups in the acrylic copolymer is usually at least 2.5:1. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4 hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated add functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated add functional monomers used to prepare the beta-hydroxy ester functional monomers include monocarboxylic acids such as acrylic add, methacrylic acid, crotonic acid; dicarboxylic acids such as laconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentane oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether Particular glycidyl esters include those of the structure:

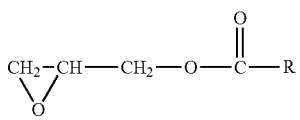

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic adds include VERSATIC ACID 11 and CARDURA E, each of which is commercially available from Shell Chemical Co.

Acrylic polymers can be prepared via aqueous emulsion polymerization techniques and used directly in the preparation of aqueous coating compositions. More often, the acrylic polymers are prepared via organic solution polymerization with groups capable of salt formation such as acid or amine groups, and upon neutralization of these groups with a base or acid, the polymers can be dispersed into aqueous medium. Generally any method of producing such polymers that is known to those skilled in the art utilizing art recognized amounts of monomers can be used. The acrylic polymer typically has a calculated glass transition temperature ($T_g$) of greater than 10 often around 29° C.

The water dispersible acrylic polymer c) is often added to the waterborne curable film-forming composition in the form of an aqueous emulsion of the acrylic polymer, and the acrylic polymer is typically prepared from a reaction mixture comprising butyl acrylate, methyl methacrylate, styrene, hydroxyethyl methacrylate, acrylic acid, and a reaction product of acrylic acid and a glycidyl ester.

When used, the water dispersible acrylic polymer c) is usually present in the first component of the waterborne curable film-forming composition in an amount of up to 30 percent by weight, based on the total weight of resin solids in the first component of the curable film-forming composition. The water dispersible acrylic polymer may be used as a grind vehicle for the pigment in the first component. At least a portion (less than 100 percent) of the aqueous emulsion of the acrylic polymer may be used as a grind vehicle, or up to 100 percent (i.e., up to its entirety).

The waterborne curable film-forming compositions used in the present invention may contain adjunct ingredients conventionally used in coating compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids.

The waterborne curable film-forming compositions of the present invention usually have a total solids content of at least 60 percent by weight, and a VOC up to 2.1.

It is often not practical to store ambient-cure coatings as a one-package composition, but rather they must be stored as multi-package coatings to prevent the components from curing prior to use. The term "multi-package coatings" refers to coatings in which various components are maintained separately until just prior to application. The compositions of the present invention are usually multi-package coatings, such as a two-package coating, wherein the first component a) is a first package and the second component b) is the second package. When the hydroxyl functional, water dispersible acrylic polymer c) is present, it may be a separate, third package and/or combined with either or both of the other two packages. Usually it is present at least in the first package since it is often used as a grind vehicle for the pigment in the first component.

In the multilayer coated substrates of the present invention comprising both a primer and a sealer composition, either one or both comprise any of the waterborne curable film-forming compositions described above. If they both comprise a waterborne curable film-forming composition as described above, they may be the same as each other or different. If the primer composition does not comprise any of the waterborne curable film-forming compositions described above, it may be any conventional primer composition known in the art. Likewise, if the sealer composition does not comprise any of the waterborne curable film-forming compositions described above, it may be any conventional sealer composition known in the art. In any event, at least one of them comprises a waterborne curable film-forming composition as described above.

After application of the sealer composition, light sanding of the sealer may be performed, though it is often not necessary, and at least one additional coating composition may be applied. Usually this comprises one or more topcoats. A topcoat provides, inter alia, aesthetic properties such as color to the substrate, and may be a monocoat or a composite coating system comprising a colored basecoat followed by a clear coat. The multilayer coated substrates of the present invention, prepared using the waterborne primer and/or sealer compositions of the present invention, demonstrate minimal to no film defects in the form of pops and/or pinholes.

Each coating composition (primer, sealer, etc.) may be applied by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, can be used.

After application of a composition, a film is formed by driving solvent, i.e., organic solvent and water, out of the film by heating or by an air-drying period. Suitable drying conditions will depend on the particular composition and/or application, but in some instances a drying time of from about 5 to 30 minutes at a temperature of about room temperature to 60° C. will be sufficient. More then one coating layer of each composition may be applied if desired. Usually between coats, the previously applied coat is flashed; that is, exposed to ambient conditions for the desired amount of time.

The primer composition of the present invention may be applied in no more than two coats and yet demonstrates a dry film thickness of at least 50 microns or at least 60 microns, or at least 100 microns, to at most 150 microns or at most 126 microns. This is not usually possible with waterborne primer compositions, which typically require three or more coats to achieve a comparable film build, resulting in film defects such as pops and/or pinholes. Dry film thicknesses may be measured 24 hours after application of the coating when cured at ambient temperatures, using a DUALSCOPE FMP40C with an FD13H probe, available from Fischer Technologies, Inc., according to manufacturers directions.

The primer composition of the present invention is typically curable at a temperature below 60° C., often below 30° C. It is also sandable within fifteen minutes of application. The primer composition of the present invention may be cured overnight at ambient temperatures or force cured for 30 minutes at 60° C.

When both a primer and sealer are used, the sealer composition may be applied on top of the primer composition, usually after the primer has been sanded. The sealer composition of the present invention may be applied in no more than two coats and yet demonstrates a dry film thickness of 20 to 50 microns. The sealer composition of the present invention is typically curable at a temperature below 60° C., often below 30° C. Light sanding, or de-nibbing, of surface imperfections is possible within fifteen minutes of drying.

Each of the characteristics and examples described above, and combinations thereof, may be said to be encompassed by the present invention. The present invention is thus drawn to the following nonlimiting aspects: in a first aspect, a multilayer coated substrate is provided by the present invention, comprising: A) a substrate; B) a primer composition applied directly to a surface of the substrate, forming a first coating; C) a sealer composition applied on top of the first coating; and D) at least one topcoat applied on top of the sealer composition; wherein the sealer composition comprises a waterborne curable film-forming composition, the waterborne curable film-forming composition comprising:
 a) a first component comprising an aqueous dispersion of a pigment and
  i) polymeric urethane-shell particles having a core-shell morphology and having hydroxyl functional groups, wherein the core of the polymeric urethane-shell particles is prepared from a monomer mixture comprising hydrophobic, ethylenicaily unsaturated monomers and wherein the shell of the polymeric urethane-shell particles comprises a polyurethane or polyurethane-urea polymer; or
  ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;
 b) a second component comprising a polyisocyanate crosslinking agent; and optionally
 c) a hydroxyl functional, water dispersible acrylic polymer.

In a second aspect, a multilayer coated substrate is provided according to the first aspect above, wherein the primer composition comprises a waterborne curable film-forming composition, the waterborne curable film-forming composition comprising:
 a) a first component comprising an aqueous dispersion of a pigment and
  i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
  ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;
 b) a second component comprising a polyisocyanate crosslinking agent; and optionally
 c) a hydroxyl functional, water dispersible acrylic polymer.

In a third aspect in a multilayer coated substrate according the second aspect above, the primer composition is applied in no more than two coats and demonstrates a dry film thickness of 50 to 150 microns.

In a fourth aspect in a multilayer coated substrate according to any of the aspects above, the first component in the waterborne curable film-forming composition comprises an aqueous dispersion of a pigment and the polymeric urethane-shell particles of i), wherein the core of the polymeric urethane-shell particles is prepared from a monomer mixture comprising: 1) at least one of n-butyl (meth)acrylate, isobutyl (meth)acrylate, lauryl (meth)acrylate, 2-ethylhexyl (meth) acrylate, stearyl (meth) acrylate, isobornyl (meth) acrylate, cyclohexyl (meth)acrylate, and styrene, and further optionally comprising: 2) at least one of hydroxyethyl (meth)acrylate and hydroxypropyl (meth)acrylate.

In a fifth aspect in a multilayer coated substrate according to any of the first through third aspects above, the first component in the sealer composition comprises an aqueous dispersion of a pigment and the polymeric acrylic-shell particles of ii), wherein the core of the polymeric acrylic-shell particles is prepared from a monomer mixture comprising: 1) at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth)acrylate, and styrene, and further optionally comprising: 2) at least one of hydroxyethyl (meth) acrylate and hydroxypropyl (meth)acrylate; and wherein the shell of the polymeric acrylic-shell particles is prepared from a monomer mixture comprising at least one of methoxypolyethylene glycol (meth)acrylate, (meth)acrylic acid, crotonic add, itaconic add, maleic add, fumaric add, hydroxyethyl (meth)acrylate, hydroxypropyl (meth)acrylate, 4-hydroxybutyl (meth)acrylate, hydroxy functional adducts of caprolactone, methyl (meth)acrylate, (meth)acrylonitrile, dimethylaminoethyl(meth)acrylate, isopropyl (meth)acrylamide, dimethylaminoethyl (meth)acrylate, diethylaminoethyl (meth)acrylate, and ethylene glycol dimethacrylate.

In a sixth aspect in a multilayer coated substrate according to any of the aspects above, the sealer composition is applied in no more than two coats and demonstrates a dry film thickness of 20 to 50 microns.

In a seventh aspect in a multilayer coated substrate according to any of the aspects above, the sealer composition is curable at a temperature below 60° C.

In an eighth aspect in a multilayer coated substrate according to any of the aspects above, the sealer composition further comprises the water dispersible acrylic polymer c) in the form of an aqueous emulsion of an acrylic polymer, wherein the acrylic polymer is prepared from a reaction mixture comprising butyl acrylate, methyl methacrylate, styrene, hydroxyethyl methacrylate, acrylic acid, and a reaction product of acrylic add and a glycidyl ester.

In a ninth aspect in a multilayer coated substrate according to the eighth aspect above, at least a portion of the aqueous emulsion of the acrylic polymer is used as a grind vehicle for the pigment.

In a tenth aspect, a multilayer coated substrate is provided by the present invention, comprising: A) a substrate; B) a primer composition applied directly to a surface of the substrate, forming a first coating; C) a sealer composition applied on top of the first coating; and D) at least one topcoat applied on top of the sealer composition; wherein the primer composition comprises a waterborne curable film-forming composition, the waterborne curable film-forming composition comprising:
  a) a first component comprising an aqueous dispersion of a pigment and
    i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
    ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;
  b) a second component comprising a polyisocyanate crosslinking agent; and optionally
  c) a hydroxyl functional, water dispersible acrylic polymer.

In an eleventh aspect, a multilayer coated substrate is provided according to the tenth aspect above, wherein the sealer composition comprises a waterborne curable film-forming composition, the waterborne curable film-forming composition comprising:
  a) a first component comprising an aqueous dispersion of a pigment and
    i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shall of the polymeric urethane-shell particles comprises a polyurethane or polyurethane-urea polymer; or
    ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;
  b) a second component comprising a polyisocyanate crosslinking agent; and optionally
  c) a hydroxyl functional, water dispersible acrylic polymer.

In a twelfth aspect in a multilayer coated substrate according to the eleventh aspect above, the sealer composition is applied in no more than two coats and demonstrates a dry film thickness of 20 to 50 microns.

In a thirteenth aspect in a multilayer coated substrate according to any of the tenth though twelfth aspects above, the primer composition is applied in no more than two coats and demonstrates a dry film thickness of 50 to 150 microns.

In a fourteenth aspect in a multilayer coated substrate according to any of the tenth through thirteenth aspects above, the first component in the primer composition comprises an aqueous dispersion of a pigment and the polymeric urethane-shell particles of i), wherein the core of the polymeric urethane-shell particles is prepared from a monomer mixture comprising: 1) at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth)acrylate, and styrene, and further optionally comprising: 2) at least one of hydroxyethyl (meth)acrylate and hydroxypropyl (meth)acrylate.

In a fifteenth aspect, in a multilayer coated substrate according to any of the tenth through fourteenth aspects above, the primer composition is curable at a temperature below 60° C.

In a sixteenth aspect in a multilayer coated substrate according to any of the tenth through fifteenth aspects above, the primer composition further comprises the water dispersible acrylic polymer c) in the form of an aqueous emulsion of an acrylic polymer, wherein the acrylic polymer is prepared from a reaction mixture comprising butyl acrylate, methyl methacrylate, styrene, hydroxyethyl methacrylate, acrylic acid, and a reaction product of acrylic acid and a glycidyl ester.

In a seventeenth aspect, in a multilayer coated substrate according to the sixteenth aspect above, at least a portion of the aqueous emulsion of the acrylic polymer is used as a grind vehicle for the pigment.

In an eighteenth aspect, a multilayer coated substrate is provided by the present invention, comprising: A) a substrate; B) a first composition comprising a primer or sealer composition applied directly to a surface of the substrate, forming a first coating; and C) at least one topcoat applied on top of the first coating; wherein the first composition comprises a waterborne curable film-forming composition, the waterborne curable film-forming composition comprising:
  a) a first component comprising an aqueous dispersion of a pigment and
    i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared from a monomer mixture comprising hydrophilic, ethylenically unsaturated monomers;

b) a second component comprising a polyisocyanate crosslinking agent; and optionally c) a hydroxyl functional, water dispersible acrylic polymer; and wherein when the first composition comprises a primer composition, the first coating is applied in no more than two coats and demonstrates a dry film thickness of 50 to 150 microns, and when the first composition comprises a sealer composition the first coating composition is applied in no more than two coats and demonstrates a dry film thickness of 20 to 50 microns.

The following examples are intended to illustrate variations of the invention, and should not be construed limiting the invention in any way. Unless otherwise indicated, all parts are by weight.

EXAMPLES

Example A

A polyesterdiol for use in the preparation of a urethane dispersion was prepared as follows:

To a 4-necked round bottom flask fitted with a stirrer, gas inlet, packed column, thermometer, and condenser was added 2478 g 1,6-hexanediol, 1456 g neopentyl glycol, 1533 g adipic acid, 2324 g isophthalic acid, 343 g maleic anhydride, 7.2 g butylstannoic acid and 7.2 g triphenyl phosphite. The reaction mixture was heated in stages under an inert $N_2$ atmosphere to a maximum temperature of 230° C. while ensuring that the head temperature did not exceed 100° C. When the acid value reached 10, a Dean Stark trap was fitted to the flask and 100 g toluene was added to facilitate removal of the final amounts of water. The reaction was held until the residual acid value was <2, after which time the reaction was cooled to 180° C. and vacuum was applied for 30 minutes. The resulting viscous resin had a solids of 99%, a viscosity at 80% solids in butyl glycal of Z1 (Gardner-Holdt), and a theoretical OH value of 110.

Example B

A urethane dispersion for use in the preparation of urethane-shell particles was prepared as follows:

To a 4-necked round bottom flask fitted with a stirrer, gas inlet tube, addition funnel, thermometer and condenser was added 120.6 g dimethylolpropionic add, 616.2 g of the polyesterdiol of Example A, 1.5 g triphenylphosphite, 1.9 g ionol, 1.5 g dibutyltin dilaurate. The mixture was heated to 80° C. for 30 minutes to dissolve the dimethylolpropionic acid. 613.5 butyl methacrylate was then added and the mixture was coded to 50° C. and maintained under an air atmosphere. 466.2 g isophorone diisocyanate was then added via addition funnel over 20 minutes while ensuring the temperature did not exceed 70° C. The addition funnel was then rinsed with 30 g butyl methacrylate, and the mixture was heated to 100° C. The reaction was held for 2-3 hours at 100° C., until the NCO value stalled. 160.8 g trimethylol propane and 81.6 g pentaerythritol were then added, and the reaction was held for 1 hour. After this time, infrared analysis showed complete consumption of isocyanate. The solution was cooled to 90° C., 146 g butylglycol and 48.1 g dimethyl ethanolamine were added, and stirred for 10 minutes. 1923 g of the above solution was then dispersed into 2176 g deionized water that was preheated to 30° C. in a 4-necked round bottom flask under air atmosphere. The ensuing small particle size, waterborne dispersion had a solids level of 31.5%, a viscosity of 228 cps, a pH value of 6.7, and a particle size of ~50 nm.

Example C

A dispersion of urethane-shell particles was prepared as follows

To a 4-necked round bottom flask fitted with a stirrer, gas inlet for $N_2$ sparge, thermometer and condenser was added 2750 g of the urethane dispersion of Example B, 410 g deionized water, 74.3 g 2-ethylhexyl acrylate, 11 g butyl methacrylate, 222.8 g styrene, and 165 g hydroxyethyl methacrylate. The solution was heated to 35° C. and sparged with $N_2$ for 30 minutes to remove dissolved oxygen. A solution of 0.0033 g ferrous ammonium sulfate in 25 g deionized water was then added followed by the addition of a solution of 3.18 g isoascorbic acid, 3.21 g dimethyl ethanolamine in 75 g of deionized water. The solution was stirred for 5 minutes and ~80% of a solution of 14.5 g of a 35% hydrogen peroxide solution diluted in 120 g of deionized water added over ~5 minutes. A rapid exotherm with a maximum temperature of 68° C. ensued. The reaction was then held at 65° C. for 30 min, then cooled to 30° C. The remainder of the hydrogen peroxide solution was then added over 2-3 minutes. A solution of 17.8 g dimethyl ethanolamine in 35 g of deionized water was added. The nearly transparent dispersion had a solids content of 43%, a viscosity of 290 cps, a pH value of 7.5 and a particle size of ~60 nm.

Example D

A dispersion of urethane-shell particles was prepared as follows:

To a 4-necked round bottom flask fitted with a stirrer, gas inlet for $N_2$ sparge, thermometer and condenser was added 500 g of the urethane dispersion of Example B, 95 g deionized water, 22.5 g butyl acrylate, 7.5 g butyl methacrylate, 56.2 g styrene, and 75 g hydroxypropyl methacrylate. A solution of 0.7 g mercaptopropionic acid, 0.6 g of dimethyl ethanolamine in 20 g of deionized water was then added. The solution was heated to 35° C. and sparged with $N_2$ for 30 minutes to remove dissolved oxygen. A solution of 0.43 g LUPEROX TBH70x (t-butyl hydroperoxide) in 15 g deionized water was then added. A solution of 0.0069 g ferrous ammonium sulfate, 0.43 g sodium metabisulfite and 0.21 g dimethyl ethanolamine in 50 g deionized water was then added over ~5 minutes to initiate the polymerization. A rapid exotherm with a maximum temperature of 70° C. ensued. The reaction was then held at 65° C. for 30 min, then cooled to 30° C. A solution of 2.6 g dimethyl ethanolamine in 5 g of deionized water was added. The nearly transparent dispersion had a solids content of 44%, a viscosity of 224 cps, a pH value of 8.2.

Example E

An acrylic dispersion for use as the component c) in the waterborne curable film-forming composition was prepared as follows:

To a 4-necked round bottom flask fitted with a stirrer, gas inlet for $N_2$ sparge, thermometer and condenser was added 289 g Cardura E and 190 g DOWANOL PM and the mixture was heated to reflux (~135° C.). To one addition funnel was added 80 g t-Butyl peracetate (LUPEROX 7M50) and 40 g DOWANOL PM, to a second addition funnel was added 238 g butyl acrylate, 190.4 g methyl methacrylate, 428.4 g styrene, 375.7 g hydroxyethyl methacrylate, and 86.7 g acrylic acid. The initiator solution is added over a total of 4 hours, the monomer addition is added over a total of 3 hours (not including stoppages—see below). Both the initiator and monomer additions are begun. After 40 minutes the monomer addition is stopped, an additional 30.6 g of acrylic acid and 5 g DOWANOL PM are added and the mixture is stirred for 10 min. The monomer addition in re-started (50 min). After another 30 minutes (80 total) the monomer addition is stopped and 30.6 g acrylic acid and 5 g DOWANOL PM are added and the mixture is stirred for 10 min. The monomer addition is re-started (90 min). After another 40 min the monomer addition is stopped and 30.6 g acrylic add and 5 g DOWANOL PM are added and the mixture is stirred for 10 min. The monomer addition is re-started (140 min), and the monomer addition is complete after 40 minutes. After both additions are complete, the reaction is held for 1.5 hours. The resin is then coded to 90° C., followed by the addition of 90.8 g DMEA. A fine particle size dispersion is produced by then dispersing 1845 g of the acrylic into 2185 g of deionized water that has been preheated to 70° C. The final dispersion had a solids content of 40%, a viscosity of 700 cps, a pH value of 7.5 and a particle size of ~90 nm.

Example F

A hyperbranched acrylic polymer for use in the preparation of acrylic-shell particles was prepared as follows: A 300 cm$^3$ electrically heated continuous stirred tank reactor with an internal cooling coil was filled with butyl glycol and the temperature was adjusted to 210° C. The following charge was fed to the reactor at the rate of 100 ml/min-1600 g methyl methacrylate, 1460 g butyl acrylate, 400 g hydroxyethyl methacrylate, 400 g acrylic acid and 140 g allyl methacrylate, 320 g butyl glycol, and 160 g ditertiary butyl peroxide at the rate of 100 ml/min. The residence time in the reactor was ~3 minutes. The reactor was kept volumetrically full at a pressure of 400-600 psi, and the temperature was held constant at ~210° C. The reactor output was drained to a 3000 cm$^3$ continuous stirred tank reactor fitted with a pressure relief valve and set to 170° C. A chase initiator solution was then added to the contents of the tank reactor at the rate of 3 ml/min. The composition of this chase solution was 80 g butyl glycol and 40 g ditertiarybutyl peroxide. When ~1500 g of the product had been collected in the second reactor, the outlet valve as opened and the material was fed to a collection vessel at a rate that maintained a constant fill level resulting in 20 minute residence time. The resulting hyperbranched acrylic polymer had a solids content of 87.5%, an add value of 65, a number average molecular weight of 1870 and a weight average molecular weight of 18000.

Example G

A dispersion of acrylic-shell particles were prepared as follows: To a 4-necked round bottom flask fitted with a stirrer, gas inlet for N2 sparge, thermometer and condenser was added 527 g of Example F, 47 g dimethyl ethanolamine, and 1914 g deionized water that was pre-warmed to 50° C. The solution was held at 50° C. and sparged with N2 for 30 minutes to remove dissolved oxygen. A solution of 3.46 g ascorbic add and 5.2 g dimethyl ethanolamine in 20 g deionized water was added, followed by a solution of 0.027 g ferrous ammonium sulfate in 4 g deionized water. In one addition funnel was added 6 g t-butyl hydroperoxide (LUPEROX TBH70X) in 114 g deionized water. In a separate addition funnel was added 316.8 g butyl acrylate, 316.8 g methyl methacrylate, 316.8 g styrene, and 158.3 g hydroxyethyl methacrylate. The initiator and monomer solution were then added simultaneously over 2.5 hours. After the additions were complete, the polymer was held for 1 hour at 50° C. A solution of 11.7 g dimethyl ethanolamine in 10 g deionized water was then added. The final dispersion had a solids content of 42.5%, a viscosity of 170 cps, a pH value of 7.8, and a particle size of 75 nm.

Sealer:

Urethane acrylate sealer coatings were prepared by first producing a grind paste (Examples H and I) made with the following ingredients. The binder portion of the grind pasta may consist of either Urethane-shell particles of Example C or the Acrylic Dispersion of Example E.

TABLE 1

Grind pastes for polyurethane acrylate sealer coating

| Charge | Name | Example H Weight (g) | Example I Weight (g) |
| --- | --- | --- | --- |
| 1(a) | Urethane-shell particles of Example C | 833 | — |
| 1(b) | Acrylic dispersion of Example E | — | 527 |
| 2 | DISPERBYK 024[1] | 16 | 10 |
| 3 | Dispex ® Ultra PA 4550[2] | 21 | 13 |
| 4 | SURFYNOL 104E[3] | 25 | 16 |
| 5 | Carbon Black | 25 | 15 |
| 6 | Titanium Dioxide | 546 | 343 |
| 7 | Barium Sulfate | 614 | 390 |
| 8 | Talc | 437 | 277 |
| 9 | Calcium Carbonate | 240 | 152 |
| 10 | DI Water | 94 | 142 |
| 11 | 10 DMEA/90 DI Water | 53 | 30 |
| 12 | DI Water | 287 | 121 |

[1]Available from BYK
[2]Available from BASF
[3]Available from Air Products

The ingredients of charges 1 through 10 were first dispersed with a high speed Cowles mixer for 30 minutes. Charge 11 was added and stirring continued for 30 minutes. Charge 12 was added and the mixture was basket milled on a Hockmeyer Micro Mill until a 7 Hegman was achieved.

Sealer coating compositions of the present invention were prepared as shown below:

TABLE 2

Polyurethane Acrylate Sealer coating compositions

| Charge | Name | Example J Weight (g) | Example K Weight (g) |
| --- | --- | --- | --- |
| 1(a) | Grind Paste of Example H | 375 | — |
| 1(b) | Grind Paste of Example I | — | 367 |
| 2 | Urethane-shell particles of Example C | 254 | 244 |

TABLE 2-continued

Polyurethane Acrylate Sealer coating compositions

| Charge | Name | Example J Weight (g) | Example K Weight (g) |
|---|---|---|---|
| 4 | EHW8224 Hardener[1] | 97 | 103 |
| 5 | T494 Reducer[2] | 73 | 88 |

[1]Water reducible isocyanate available from PPG industries
[2]Waterbased reducer available from PPG industries The final paints had a solids content of 53% at application and ambient temperature viscosity of 20 seconds #4 DIN cup.

The sealer coating compositions of Example J and Example K were spray applied at ambient conditions onto 24"×34"×0.04" aluminum door skin panels over a gray coil coating. The substrate panels were obtained from Q-Lab of Westlake, Ohio. The gray coil coating was first scuffed using a Scotch-Brite scouring sponge. The coating compositions were applied in one coat and then blown dry with a forced air knife. The dry film thickness was 25-33 microns. The control coating was a solvent borne Refinish sealer commercially available from PPG Industries, Inc. as ECS25. This was applied in one coat and was avowed to flash at ambient conditions from glossy to matte. The film thickness was about 25-28 microns. Film thicknesses of all coatings were measured using a DUALSCOPE FMP40C with an FD13H probe, available from Fischer Technologies, Inc., according to manufacturer's directions.

The sealer coatings were tested for their air drying capability through a body shop procedure called de-nibbing. De-nib on a sealer is done before application of the basecoat if there are dust or other very small particles (nibs) to be removed. It is a very light sanding by hand. De-nibbing on the sealers was performed with an 800 grit sand paper available from 3M at 10 minutes after the coatings were matte finish. The de-nib is considered a pass if the coating is not sticky, the sand paper does not drag, and a powder forms under the sand paper. Hardness of the sealer coatings can also be measured via a Konig pendulum hardness tester using ASTM D4366.

After about 30 minutes, the sealer coatings were topcoated. The first layer of topcoat was a basecoat available from PPG Industries, T409, applied to the door skin panels in two coats and force air dried after each coat. The total dry film thickness was 4-6 microns. A 2K Refinish clear coat commercially available from PPG Industries, Inc. as DC2000 was then applied over the coated panel in two coats with a flash between coats. The clear coated panels were allowed to flash overnight. The dry film thickness was approximately 50 microns.

The appearance of the coating stack was measured with a Byk-WAVESCAN and the results are reported as DOI/du/Wa/Wb/Wc/Wd. The Wa measurement is for short wavelength structure (0.01-0.3 mm). Wc for intermediate wavelengths (1-3 mm) and We for longer wavelength structures (10-30 mm). Smoothness is a particularly important property for an automotive coating and can depend on the relative roughness of all the layers in the coating stack. Lower du and W values and higher DOI values indicate a smoother film.

TABLE 3

Denib Rating and Appearance Values

| | Denib | DOI | du | Wa | Wb | Wc | Wd |
|---|---|---|---|---|---|---|---|
| Example J | Pass | 87.9 | 6.4 | 25.2 | 39.5 | 28 | 35.2 |
| Example K | Pass | 88.9 | 6.8 | 25.1 | 35.6 | 24.2 | 26.8 |
| Control ECS25 | Pass | 85 | 3.1 | 19.1 | 49.9 | 40.6 | 34.4 |

Acrylic sealer coatings were prepared by first producing a grind paste (Example L) made with the following ingredients. The binder piton of the grind paste may consist of the Acrylic Dispersion of Example E.

TABLE 4

Grind Paste For Acrylic Sealer Coating

| Charge | Name | Example L Weight (g) |
|---|---|---|
| 1 | Acrylic dispersion of Example E | 490 |
| 2 | Disperbyk 024[1] | 9 |
| 3 | Dispex ® Ultra PA 4550[2] | 12 |
| 4 | Surfynol 104E[3] | 15 |
| 5 | Carbon Black | 5 |
| 6 | Titanium Dioxide | 321 |
| 7 | Barium Sulfate | 361 |
| 8 | Talc | 257 |
| 9 | Calcium Carbonate | 141 |
| 10 | DI Water | 131 |
| 11(a) | 10 DMEA/90 DI Water | — |
| 11(b) | 5 DMEA/95 DI Water | 57 |
| 12 | DI Water | 131 |

[1]Available from BYK
[2]Available from BASF
[3]Available from Air Products

The ingredients of charges 1 through 10 were first dispersed with a high speed Cowles mixer for 30 minutes. Charge 11(a) and/or 11(b) was added and stirring continued for 30 minutes. Charge 12 was added and the mixture was milled on a Hockmeyer Micro Mill until a 7 Hegman was achieved.

Sealer coating compositions of the present invention were prepared as shown below:

TABLE 5

Acrylic Sealer Coating Composition

| Charge | Name | Example M Weight (g) |
|---|---|---|
| 1 | Grind Paste of Example L | 63 |
| 2 | Acrylic-shell particles of Example G | 47 |
| 3 | EHW8224 Hardener[1] | 13 |
| 4 | T494 Reducer[2] | 8 |

[1]Water reducible isocyanate available from PPG industries
[2]Waterbased reducer available from PPG industries The final paint had a solids content of 53% and application viscosity of 34 cPs on a Brookfield CAP 2000 spindle #1 at 900 rpm. The sealer coating composition of Example M was spray applied at ambient conditions onto 12"×4"×0.032" steel panels with a gray electrodeposition coating. The substrate panels were obtained from ACT Laboratories Inc., LLC of Hillsdale, Mich. The coating composition was applied in one coat and then blown dry with a forced air knife. The dry film thickness was 28-38 microns. The control coating was a Refinish solvent borne sealer, ECS25, commercially available from PPG Industries, Inc. This was spray applied in two coats and was allowed to flash at ambient conditions from glossy to matte. The film thickness was about 40-45 microns.

After about 30 minutes, the sealer coatings were topcoated. The first layer of topcoat was a basecoat available from PPG industries Inc., T409, applied to the panels in two coats using a forced air knife after each coat. The film thickness was 4-6 microns. A 2K Refinish clear coat commercially available from PPG Industries, Inc. as DC4010 was then applied over the coated panel in two coats with a flash between coats. The clear coated panels were avowed to flash overnight. The clear coat film thickness was approximately 57-60 microns.

Table 6 lists the results of hardness and appearance testing.

TABLE 6

Acrylic Sealer Konig Hardness and Appearance of Coating Stack

|  | Konig (sec) | du | Wa | Wb | Wc | Wd | We |
|---|---|---|---|---|---|---|---|
| Example M | 94 | 3.5 | 12.2 | 30.1 | 18.4 | 30.3 | 13.5 |
| Control ECS25 | 64 | 1.5 | 11.1 | 26.0 | 14.3 | 20.5 | 13.1 |

It can be concluded from the data shown in Tables 3 and 6, that sealer formulas of the present invention have the speed of drying, as well as appearance, required to meet or exceed the solvent borne control in the refinish repair process.

Primer:

Primer coatings were prepared by first producing a grind paste (Example N) made with the following ingredients. The binder portion of the grind paste may consist of the dispersion of urethane-shell particles of Example D.

TABLE 7

Grind Paste for Urethane Acrylate Primer Coating

| Charge | Name | Example N Weight (g) |
|---|---|---|
| 1 | Urethane-shell particles of Example D | 741 |
| 2 | Disperbyk 024[1] | 16 |
| 3 | Dispex ® Ultra PA 4550[2] | 21 |
| 4 | Surfynol 104E[3] | 25 |
| 5 | Carbon Black | 23 |
| 6 | Titanium Dioxide | 524 |
| 7 | Barium Sulfate | 607 |
| 8 | Talc | 432 |
| 9 | Calcium Carbonate | 238 |
| 10 | DI Water | 323 |
| 11 | 10 DMEA/90 DI Water | 53 |
| 12 | DI Water | 323 |

[1]Available from BYK
[2]Available from EFKA
[3]Avaliable from Air Products

The ingredients of charges 1 through 10 were first dispersed with a high speed Cowles mixer for 30 minutes. Charge 11 was added and stirring continued for 30 minutes. Charge 12 was added and the mixture was milled on a Hockmeyer Micro Mill until a 7 Hegman was achieved.

Primer coating compositions of the present invention were prepared as shown below:

TABLE 8

Primer Coating Compositions

| Charge | Name | Example O Weight (g) | Example P Weight (g) | Example Q Weight (g) |
|---|---|---|---|---|
| 1 | Grind Paste of Example N | 122 | 122 | 122 |
| 2 | Urethane-shell particle of Example D | 77 | 77 | 77 |
| 4 | EHW8224 Hardener[1] | 28 | 28 | 28 |
| 5 | T494 Reducer[2] | 9 | 17 | 28 |
|  | % Solids | 52 | 55 | 57 |
| Viscosity | (cPs) | 32 | 40 | 55 |

[1]Water reducible isocyanate available from PPG industries
[2]Waterbased reducer available from PPG industries Wedge Panel The sag resistance properties were tested as a function of climatic conditions against a one-component waterborne primer. The control was EPW115, a primer commercially available from PPG Industries, Inc. It was reduced by 5, 10, and 15% by weight using the same T494 Reducer as in Table 8. The primer coating compositions of the present invention and the control were spray applied at two atmospheric conditions onto 4"×18"×0.026" steel panels having a zinc phosphate pretreatment with 17 evenly spaced punched holes (Sag Panels). The Sag Panels were obtained from ACT Laboratories Inc., LLC of Hillsdale, Mich. These Sag Panels were used to measure the capability of the coatings to resist sag by spray applying a wedge of coating. The wedge is created by moving more slowly beginning at the bottom of the panel and faster as the application continues toward the top. This results in the highest film thickness area at the bottom and lower film thickness at the top. The coatings are allowed to flash vertically for 5 minutes at ambient conditions and are then baked for 30 minutes at 60° C. The coating is assessed around the holes in the panel for the sagging. The dry film thickness is measured near the area of sag around the hole. By this method, the minimum dry film thickness at which sag occurs is recorded.

TABLE 9

DFT at Sag (µm)

| Application Conditions | Viscosity | Experimental (Examples O, P, Q) | EPW 115 |
|---|---|---|---|
| 65° F. 80% RH | Low | 13 | 10 |
|  | Med | 22 | 11 |
|  | High | 39 | 15 |
| 77° F. 24% RH | Low | 41 | 24 |
|  | Med | 69 | 23 |
|  | High | 74 | 33 |

Primer Application

The primer coating composition of Example P was spray applied at ambient conditions onto 12"×4"×0.032" steel panels with a gray electrodeposition coating. The substrate panels were obtained from ACT Laboratories Inc., LLC of Hillsdale, Mich. The control coating was a Refinish solvent borne primer commercially available from PPG Industries, Inc. as D839. The coating compositions were applied in two coats with a 5 minute ambient flash in between followed by a bake for 30 minutes at 60° C.

The primer coatings were tested for Konig hardness via ASTM D4366 and through evaluation of the response to sanding. Typically a body shop will sand a primer to remove imperfections on the surface as well as to create a physical link for adhesion of the following layers. It is important to the body shop's production to be able to sand a primer very quickly after the bake process. The primers of the current invention were sanded with 320 grit sandpaper available from 3M using an air powered disc sander available from Hutchings Mfg. Co. within 5 minutes after the coatings were removed from the oven. The sandability is considered a pass if the coating is not sticky, the sandpaper does not dog, and a powder forms under the sandpaper.

TABLE 10

Primer coating Konig and Sandability Rating

|  | Konig (sec) | Sandability |
|---|---|---|
| Example P | 36 | Good |
| Control D839 | 47 | Good |

It can be seen from Tables 9 and 10 that the two-component primer of the current invention demonstrates better sag resistance over current one-component waterborne primer at a very wide range of relative humidity. The primer of the current invention is very similar in hardness to a solvent borne control. It sands comparably to the solvent borne control when just out of the oven and cool.

Therefore, We claim:

1. A multilayer coated substrate comprising:
A) a substrate;
B) a primer composition applied directly to a surface of the substrate, forming a first coating of the primer composition;
C) a sealer composition applied directly to a surface of the first coating of the primer composition; and
D) at least one topcoat comprising a colored coating composition applied on top of the sealer composition; wherein the sealer composition comprises a waterborne curable film-forming composition having a total solids content of at least 50 percent by weight, the waterborne curable film-forming composition comprising:
a) a first component comprising an aqueous dispersion of a pigment and
i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared by organic solution polymerization from a monomer mixture comprising hydrophilic, ethylenically unsaturated monomers;
b) a second component comprising a polyisocyanate crosslinking agent; and optionally
c) a hydroxyl functional, water dispersible acrylic polymer.

2. The multilayer coated substrate according to claim 1, wherein the primer composition comprises a waterborne curable film-forming composition having a total solids content of at least 50 percent by weight, the waterborne curable film-forming composition comprising:
a) a first component comprising an aqueous dispersion of a pigment and
i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared by organic solution polymerization from a monomer mixture comprising hydrophilic, ethylenically unsaturated monomers;
b) a second component comprising a polyisocyanate crosslinking agent; and optionally
c) a hydroxyl functional, water dispersible acrylic polymer.

3. The multilayer coated substrate according to claim 2, wherein the primer composition is applied in no more than two coats and demonstrates a dry film thickness of 50 to 150 microns.

4. The multilayer coated substrate according to claim 1, wherein the first component in the waterborne curable film-forming composition comprises an aqueous dispersion of a pigment and the polymeric urethane-shell particles of i), wherein the core of the polymeric urethane-shell particles is prepared from a monomer mixture comprising: 1) at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth) acrylate, and styrene, and further optionally comprising: 2) at least one of hydroxyethyl (meth)acrylate and hydroxypropyl (meth)acrylate.

5. The multilayer coated substrate according to claim 1, wherein the first component in the waterborne curable film-forming composition comprises an aqueous dispersion of a pigment and the polymeric acrylic-shell particles of ii), wherein the core of the polymeric acrylic-shell particles is prepared from a monomer mixture comprising: 1) at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth) acrylate, and styrene, and further optionally comprising: 2) at least one of hydroxyethyl (meth)acrylate and hydroxypropyl (meth)acrylate; and wherein the shell of the polymeric acrylic-shell particles is prepared from a monomer mixture comprising at least one of methoxypolyethylene glycol (meth)acrylate, (meth)acrylic acid, crotonic acid, itaconic acid, maleic acid, fumaric acid, hydroxyethyl (meth)acrylate, hydroxypropyl (meth)acrylate, 4-hydroxybutyl (meth)acrylate, hydroxy functional adducts of caprolactone, methyl (meth)acrylate, (meth)acrylonitrile, dimethylaminoethyl(meth)acrylate, isopropyl (meth)acrylamide, dimethylaminoethyl (meth)acrylate, diethylaminoethyl (meth)acrylate, and ethylene glycol dimethacrylate.

6. The multilayer coated substrate according to claim 1, wherein the sealer composition is applied in no more than two coats and demonstrates a dry film thickness of 20 to 50 microns.

7. The multilayer coated substrate according to claim 1, wherein the sealer composition is curable at a temperature below 60° C.

8. The multilayer coated substrate according to claim 1, wherein the waterborne curable film-forming composition further comprises the water dispersible acrylic polymer c) in the form of an aqueous emulsion of an acrylic polymer, wherein the acrylic polymer is prepared from a reaction mixture comprising butyl acrylate, methyl methacrylate, styrene, hydroxyethyl methacrylate, acrylic acid, and a reaction product of acrylic acid and a glycidyl ester.

9. The multilayer coated substrate according to claim 8, wherein at least a portion of the aqueous emulsion of the acrylic polymer is used as a grind vehicle for the pigment.

10. A multilayer coated substrate comprising:
A) a substrate;
B) a primer composition applied directly to a surface of the substrate, forming a first coating of the primer composition;
C) a sealer composition applied directly to a surface of the first coating of the primer composition; and
D) at least one topcoat comprising a colored coating composition applied on top of the sealer composition;
wherein the primer composition comprises a waterborne curable film-forming composition having a total solids content of at least 50 percent by weight, the waterborne curable film-forming composition comprising:
a) a first component comprising an aqueous dispersion of a pigment and
 i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
 ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared by organic solution polymerization from a monomer mixture comprising hydrophilic, ethylenically unsaturated monomers;
b) a second component comprising a polyisocyanate crosslinking agent; and optionally
c) a hydroxyl functional, water dispersible acrylic polymer.

11. The multilayer coated substrate according to claim 10, wherein the first component in the waterborne curable film-forming composition comprises an aqueous dispersion of a pigment and the polymeric urethane-shell particles of i), wherein the core of the polymeric urethane-shell particles is prepared from a monomer mixture comprising: 1) at least one of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth) acrylate, and styrene, and further optionally comprising: 2) at least one of hydroxyethyl (meth)acrylate and hydroxypropyl (meth)acrylate.

12. The multilayer coated substrate according to claim 10, wherein the waterborne curable film-forming composition further comprises the water dispersible acrylic polymer c) in the form of an aqueous emulsion of an acrylic polymer, wherein the acrylic polymer is prepared from a reaction mixture comprising butyl acrylate, methyl methacrylate, styrene, hydroxyethyl methacrylate, acrylic acid, and a reaction product of acrylic acid and a glycidyl ester.

13. The multilayer coated substrate according to claim 12, wherein at least a portion of the aqueous emulsion of the acrylic polymer is used as a grind vehicle for the pigment.

14. A multilayer coated substrate comprising:
A) a substrate;
B) a first composition comprising a primer or sealer composition applied directly to a surface of the substrate, forming a first coating; and
C) at least one topcoat applied on top of the first coating;
wherein the first composition comprises a waterborne curable film-forming composition having a total solids content of at least 50 percent by weight, the waterborne curable film-forming composition comprising:
a) a first component comprising an aqueous dispersion of a pigment and
 i) polymeric urethane-shell particles having a core-shell morphology and having hydroxyl functional groups, wherein the core of the polymeric urethane-shell particles is prepared from a monomer mixture comprising hydrophobic, ethylenically unsaturated monomers and wherein the shell of the polymeric urethane-shell particles comprises a polyurethane or polyurethane-urea polymer; or
 ii) polymeric acrylic-shell particles having a core-shell morphology and having hydroxyl functional groups, wherein the core of the polymeric acrylic-shell particles is prepared from a monomer mixture comprising hydrophobic, ethylenically unsaturated monomers and wherein the shell of the polymeric acrylic-shell particles is prepared by organic solution polymerization from a monomer mixture comprising hydrophilic, ethylenically unsaturated monomers;
b) a second component comprising a polyisocyanate crosslinking agent; and optionally
c) a hydroxyl functional, water dispersible acrylic polymer;
wherein when the first composition comprises a primer composition, the first coating is applied in no more than two coats and demonstrates a dry film thickness of 50 to 150 microns, and when the first composition comprises a sealer composition, the first coating composition is applied in no more than two coats and demonstrates a dry film thickness of 20 to 50 microns.

* * * * *